J. W. GAMBLE.
FLOW MEASURING APPARATUS.
APPLICATION FILED DEC. 20, 1913.

1,274,703.

Patented Aug. 6, 1918.
3 SHEETS—SHEET 1.

WITNESSES

INVENTOR
BY
ATTORNEY

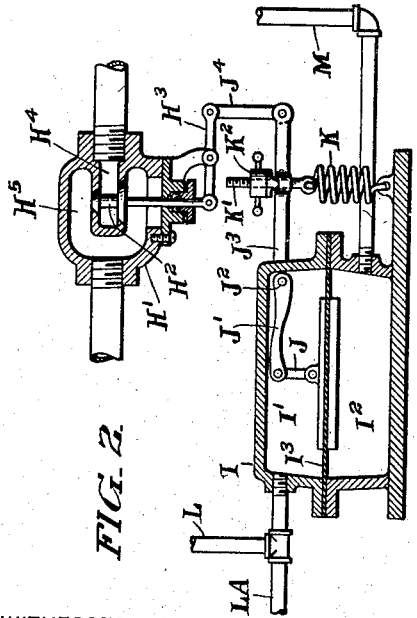

J. W. GAMBLE.
FLOW MEASURING APPARATUS.
APPLICATION FILED DEC. 20, 1913.

1,274,703.

Patented Aug. 6, 1918.
3 SHEETS—SHEET 3.

WITNESSES

INVENTOR
BY
ATTORNEY

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS UNDER THE FIRM-NAME OF HARRISON SAFETY BOILER WORKS.

FLOW-MEASURING APPARATUS.

1,274,703.

Specification of Letters Patent. Patented Aug. 6, 1918.

Application filed December 20, 1913. Serial No. 807,878.

*To all whom it may concern:*

Be it known that I, JOSEPH W. GAMBLE, a citizen of the United States of America, residing in the city and county of Philadelphia, in the State of Pennsylvania, have invented certain new and useful Improvements in Flow-Measuring Apparatus, of which the following is a true and exact description, reference being had to the accompanying drawings, which form a part thereof.

My present invention relates to flow measuring apparatus, of the kind in which the measurement of the amount of liquid flowing over a weir is determined from the varying accumulation of the liquid on the supply side of the weir; and the primary object of the invention is to provide improved means for controlling the supply of liquid to the inlet side of the weir. As distinguished from other arrangements heretofore employed in which a float or the like means, responsive solely to the accumulation of liquid in the reservoir or space receiving the discharge from the weir, has been employed to regulate the supply of liquid to the inlet side of the weir, my present invention is characterized by the provisions which I have made for regulating the supply of water in response to the difference in the amounts of water accumulating in said reservoir or chamber, and on the supply side of the weir. For example, in the preferred embodiment of my invention disclosed in detail herein, I operate a valve, controlling the supply of the liquid to be measured, by fluid pressure means responsive to the difference in head of the liquid on the supply side of the weir, and of the liquid in the reservoir or chamber receiving the discharge from the weir, arranging the apparatus so that an increase in the head on the supply side of the weir tends to increase the supply of liquid passing to the weir, while an increase in the head of liquid on the discharge side of the weir tends to decrease the supply of liquid to the weir. This arrangement possesses the advantage of tending to maintain an adequate supply of liquid in the reservoir or chamber receiving the discharge from the weir, as well when the rate of flow over the weir approaches a maximum as when the flow from the weir is comparatively small.

My improved water supply regulating means so operates that regardless of the amount of water on the supply side of the weir, the supply of liquid will be entirely cut off when the liquid level on the discharge side of the weir rises to a predetermined maximum, thus avoiding an accumulation of liquid on the discharge side of the weir large enough to interfere with the free flow of liquid over the weir; and when the liquid level on the discharge side of the weir falls to a predetermined minimum, water is supplied at the maximum rate. My liquid supply regulating means may therefore be said to be primarily responsive to the accumulation of liquid in the reservoir space or chamber receiving the discharge from the weir, but when this accumulation of liquid is between its maximum limits the operation of the regulating apparatus is modified by the accumulation of liquid on the inlet side of the weir.

The invention is of especial utility in connection with apparatus for measuring heated water, such as boiler feed water prior to its delivery to the boiler or other place of use, and when, in such use, the measuring tank containing the weir is separate from the heater, I prefer to control the supply of water to the supply side of the weir indirectly by controlling the supply of water to the heater, and to provide means whereby the flow regulating means normally responsive to the difference in the accumulation of water in the inlet and outlet chambers of the measuring tank may also be employed to properly regulate the supply of water to the heater when for any reason the weir tank may be temporarily disconnected, as for cleaning or repairs.

The various features of novelty which characterize my invention are pointed out with particularity in the claims annexed to and forming a part of this specification.

For a better understanding of the invention, however, and of the advantages possessed by it, reference should be had to the accompanying drawings and descriptive matter in which I have illustrated and described forms in which my invention may be embodied.

Of the drawings:

Fig. 2 is a sectional elevation of a portion of the regulating mechanism shown in Fig. 1;

Fig. 3 is a somewhat diagrammatic elevation of a modified form of apparatus.

Figure 1:
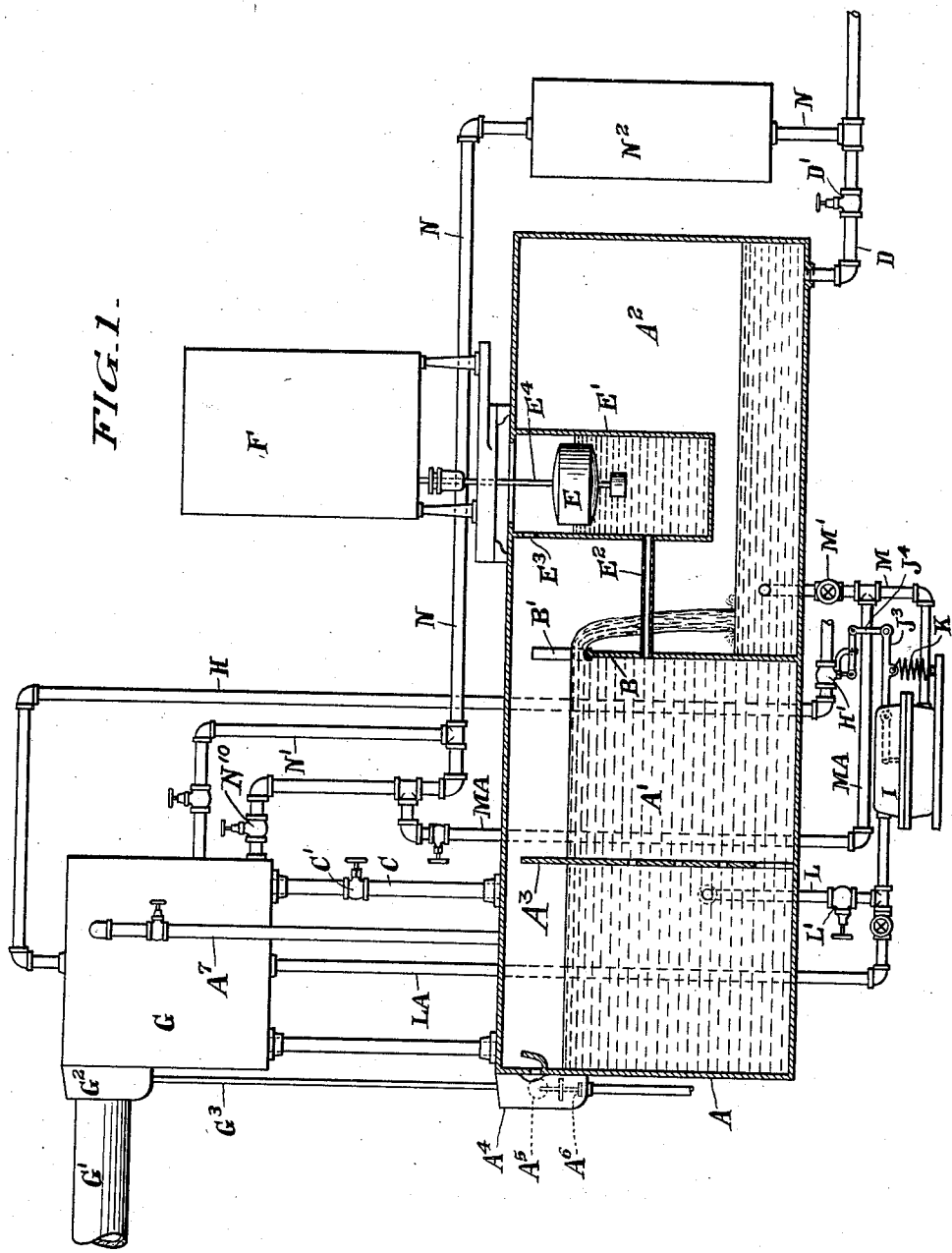
Figure 1 is a somewhat diagrammatic elevation partly in section illustrating a preferred embodiment of my invention.

In the drawings, and referring first to the construction shown in Figs. 1 and 2, A represents a closed measuring tank, divided into an inlet compartment $A'$ and an outlet compartment $A^2$ by a weir B ordinarily formed with one or more V or other suitably shaped discharge orifices $B'$ in its upper edge. C represents the pipe by which water is supplied to the inlet compartment $A'$, and $A^3$ represents a baffle interposed between the weir and the point at which the pipe C opens to the measuring tank in order to insure a quiet flow to the latter. D represents the delivery pipe from the outlet compartment of the measuring tank running to a boiler feed pump or other means or place for disposing of, or utilizing the measured water. As conventionally illustrated, a measure of the liquid flowing over the weir is obtained by means of a float E working in a float chamber $E'$ connected to the inlet compartment $A'$ of the measuring tank below the lowermost level of flow over the weir by the pipe $E^2$, and open at its upper end to the interior of the measuring tank above the water level therein through the vent orifice $E^3$. The stem $E^4$ of the float E projects up through the top wall of the measuring tank into a case F containing suitable mechanism for indicating, recording or integrating the flow from the weir as may be desired.

In the particular apparatus disclosed, G represents a heater for heating the liquid to be measured, which passes from the heater to the inlet compartment of the measuring tank through the pipe C. As conventionally illustrated, the heater G is a heater of the open feed water heater type, receiving steam for heating the water through the pipe $G'$ and oil separator $G^2$. The latter drains through the pipe $G^3$ to the float box $A^4$, which also receives the overflow from the measuring tank when for any reason the water in the inlet compartment $A'$ exceeds a certain predetermined maximum. A float $A^5$ in the float chamber $A^4$ operates a valve $A^6$ controlling the escape to waste of the liquid accumulating in the float chamber $A^4$ in excess of that required to maintain a liquid seal over the valve $A^6$. $A^7$ represents a pressure equalizing pipe connection between the vapor spaces of the heater G and tank A.

The water to be heated is supplied to the heater G through the supply pipe H and is regulated in amount by the valve $H'$ in the pipe H. The valve $H'$, in the particular form illustrated (see Fig. 2), comprises a balanced valve member $H^2$ controlling the ports connecting the inlet and outlet chambers $H^4$ and $H^5$ respectively of the valve. The stem of the valve member $H^2$ is connected externally of the valve casing to an operating lever $H^3$ pivotally connected to and thereby fulcrumed on the valve casing.

The particular form of means shown in the drawings employed for controlling the valve $H'$, partly in response to the accumulation of water in the outlet compartment $A^2$ of the measuring tank, and partly in response to the accumulation of water in the inlet compartment $A'$ of the measuring tank, comprises a differential fluid pressure balancing device I. The device I, as shown, comprises a casing divided into compartments $I'$ and $I^2$ by a flexible diaphragm $I^3$. The diaphragm $I^3$ is connected at its center by a link J to an arm $J'$ secured to the rock shaft $J^2$ passing through the wall of the chambered casing and having secured to it externally of the latter an arm $J^3$. The arm $J^3$ is connected by the link $J^4$ to the operating lever $H^3$ of the valve $H'$. A tension spring K acts on the lever arm $J^3$ in a direction tending to move the latter in the same direction as does the pressure in the chamber $I^2$. A threaded stem $K'$ and nut $K^2$ through which the tension of the spring is transmitted to the arm $J^3$ permits any desired adjustment in the tension of the spring. The chamber $I'$ is connected to the inlet compartment $A'$ of the measuring tank by the pipe L, and the chamber $I^2$ is connected to the outlet compartment of the measuring tank by the pipe M.

With the arrangement described, an increase in the height of water level in the inlet compartment $A'$ of the measuring tank increases the pressure in the chamber $I'$ and thereby tends to open the valve $H'$. An increase in the height of water level in the outlet compartment $A^2$ of the measuring tank increases the pressure in the chamber $I^2$ and tends to close the valve $H'$. The spring K also acts on the valve controlling mechanism in a direction tending to close the valve. In operation the apparatus tends to maintain a fairly fixed height of water level in the outlet compartment $A^2$, regardless of the rate at which water is withdrawn from the latter. When the rate of flow through the weir increases and the water level therefore rises on the supply side of the weir and the pressure in the chamber I' increases, the valve H' is opened wider for a given height of water level in the outlet compartment A² than when the flow over the weir is less rapid. Similarly, on a decrease in the rate at which water passes over the weir, the reduction in pressure in the chamber I' due to the decreased height of water level in the compartment A', causes the valve H' to be less widely open for a given height of water level in the compartment A² than when the rate of flow through the measuring tank is more rapid. Inasmuch, however, as the maximum possible variation in height of level on the supply side of the weir is less than the possible variation in height of water level in the outlet compartment of the tank, the rise in water level in the outlet compartment A² to a certain predetermined maximum limit will insure the closure of the valve H', even though the flow over the weir is at a maximum. When, for any reason, the water level in the compartment A² falls to a certain predetermined minimum limit, the valve H' will be fully opened, regardless of the height of water level in the compartment A', for the tension of the spring K and the pressure in the chamber I' will be sufficient for this purpose, even though the water level in the compartment A' is at its minimum.

When, as in the arrangement shown in Figs. 1 and 2, the measuring tank is supplied with water from a heater, it is sometimes desirable to insure an adequate supply of water from the heater to the device supplied with heated water when the measuring tank is not operating. This may be accomplished with the apparatus shown in Figs. 1 and 2 by opening the normally closed valve N¹⁰ in the pipe N forming a by-pass about the measuring tank A and closing the valve C' in the pipe C leading from the heater to the measuring tank,—the valve D' in the pipe D interposed between the tank A and the connection to the pipe D of the pipe N, and the valve controlling the flow through the vent pipe A⁷.

When the measuring tank is thus cut out of service it is advantageous to provide means whereby the fluid pressure device I may still control the valve H' which regulates the supply of water to the heater. One arrangement for accomplishing this purpose is illustrated in Fig. 1, wherein I have shown valves L' and M' in the pipes L and M respectively, whereby communication between the chambers A' and I' and A² and I², respectively, may be cut off. As shown in Fig. 1, I have also provided a valved connection LA between the water space of the heater G and the chamber I', and a valved connection MA between the pipe N and the chamber I². These valved connections LA and MA, which are closed in the normal operation of the apparatus, are opened when the measuring tank is cut out of service, and the valves L' and M' are then closed. Under such conditions the static pressure in the pipe N is transmitted to the chamber I². When the water level in the heater G is above the level at which the pipe LA opens to the latter, as is normally the case, and no water is being withdrawn through the pipe N, the fluid pressures acting on the opposite sides of the diaphragm I³ will obviously be equal, and the valve H' will then be closed by the spring K. When water is flowing through the pipe N the pressure transmitted to the chamber I² will be reduced, for the static head thus transmitted will be less than the total head in the pipe N at the point at which the pipe MA is connected to the latter by an amount equal to the sum of the velocity head at that point, and the loss of head from friction between that point and the heater G. The valve H' will thus be in a measure controlled in response to the rate at which water is withdrawn from the heater. When water is withdrawn from the heater so rapidly as to result in lowering the level in the chamber G below that at which the pipe LA is connected to the heater G, this tends to open the valve H' still wider, because it involves a further reduction in the pressure of the water in the pipe N transmitted to the chamber I², while the pipe LA, which remains filled with water, will then maintain a fixed pressure in the chamber I' corresponding to the difference in elevation between the chamber I' and the top of the pipe LA.

To normally maintain the water level in the heater above that at which the pipe LA is connected to the heater, it is desirable to so adjust and proportion the valve H' and its regulating mechanism that there will be a tendency to supply water a trifle more rapidly than it is withdrawn through the by-pass. To avoid the consequent liability to the accumulation of an excess of water in the heater, I provide the latter with the overflow connection N' which is connected to the pipe N at a point below on the outlet side of the point at which the pipe MA is connected to the pipe M. When the water level in the heater rises to the height at which water begins to flow through the pipe N' this reduces the velocity of discharge through the pipe N at the point at which the pipe MA is connected to the latter and thereby raises the pressure in the compartment I² of the fluid pressure device and causes the valve H' to close. The overflow connection N' thus serves to close off the supply of water to the heater when the water level in the latter rises to the height at which overflow begins. Preferably, a reservoir space is provided in connection with the by-pass, as by enlarging the latter as indicated at N², in order to avoid pulsations in the head on the inlet side of the boiler feed pump, or the like, supplied with water through the by-pass.

By suitably increasing the tension of the spring K, the pressure regulating device I may be adjusted to maintain a normal water level in the system below that of the heater G. In such case the pipe LA will be kept full of water by condensation and will therefore maintain a constant pressure in the chamber I'. In this case as well as when the apparatus is adjusted to maintain a water level in the heater above the connection to the latter of the pipe LA, the regulation of the water supply to the heater is similar to the regulation of the supply when the measuring tank is in use, in that it depends in part on the rate of flow of the water through the apparatus.

Figure 4:
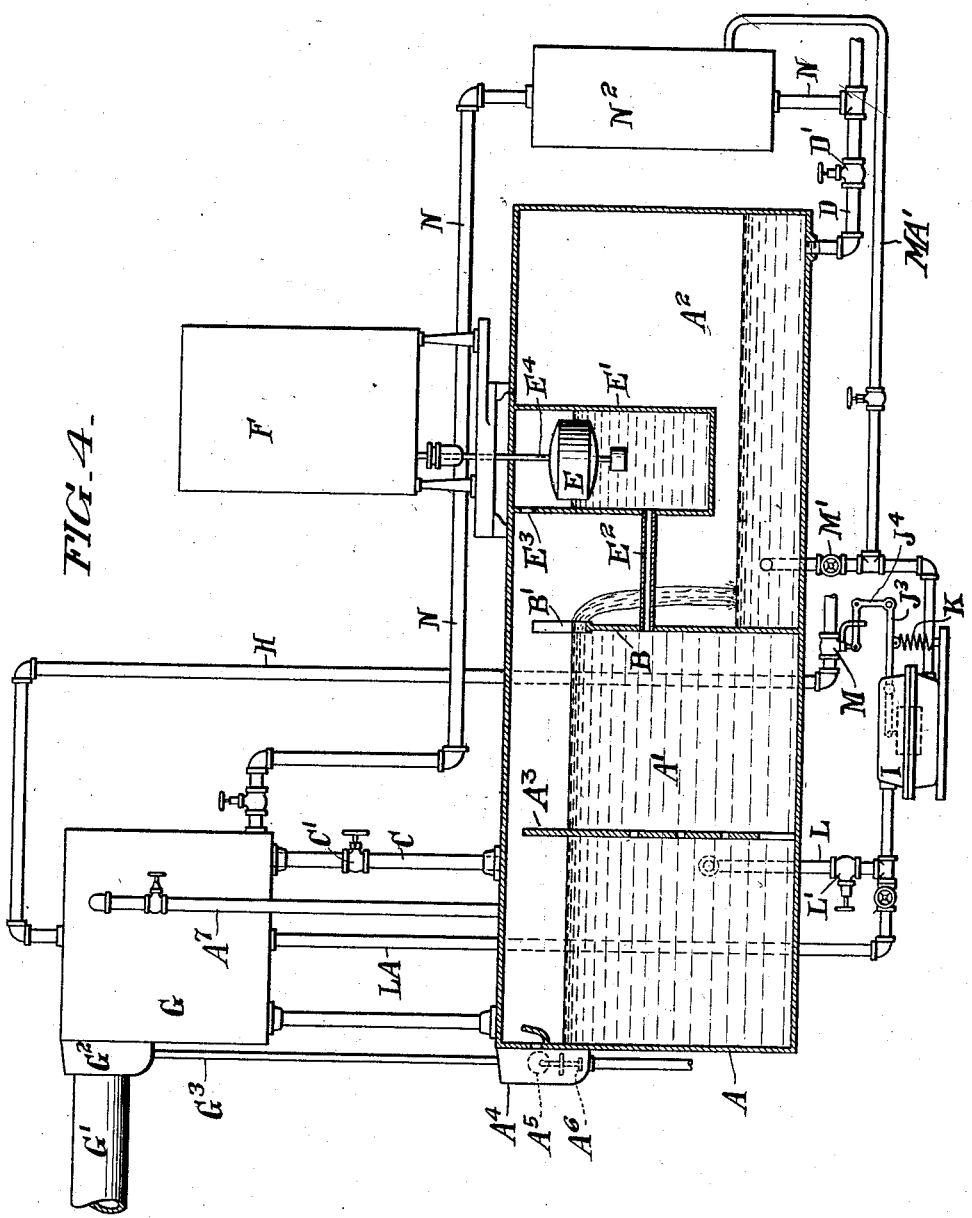
Fig. 4 is a view taken similarly to Fig. 1, showing a modified construction.

The apparatus shown in Fig. 4 differs from that shown in Fig. 1 in the omission of the pipe N' and in the fact that the pipe MA' replacing the pipe MA of Fig. 1 is connected to a lower portion of the pipe N preferably being connected as shown to the enlarged section N² near the lower end of the latter. In the use of this form of apparatus with the measuring tank cut out of service the spring K is preferably adjusted so that the enlarged section N² will serve as a reservoir, and the water level will fluctuate between normal upper and lower limits located in this reservoir.

While, as I have already stated, the apparatus disclosed is primarily devised, and is especially useful for measuring water which has been heated in an open feed water heater, it is apparent, of course, that the invention in its broader aspects is not dependent upon whether an open or a closed heater is used, nor indeed, upon the use of any heater at all; and in Fig. 3 I have illustrated an arrangement in which the regulating valve HA', which may be identical with the valve H' and is controlled by the device I and its connections L and M to the weir tank, is located in the pipe C through which water is supplied to the measuring tank. With this arrangement it is immaterial of course from what source the pipe C receives the water passed to and measured in the measuring tank. In the arrangement shown in Fig. 3, the pipe connections LA and MA are dispensed with.

While in accordance with the provisions of the statutes I have illustrated and described the best forms of my invention now known to me, it will be apparent to those skilled in the art that changes may be made in the forms of apparatus disclosed without departing from the spirit of my invention, and that under some conditions certain features of my invention may be used without a corresponding use of other features

Having now described my invention, what I claim as new and desire to secure by Letters Patent, is:

1. In combination, a measuring tank, a weir dividing it into inlet and outlet compartments, a valve regulating the supply to said inlet compartment of the liquid to be measured, and controlling means for said valve automatically responsive to the difference between the liquid heads in said compartments.

2. In combination, a measuring tank, a weir dividing it into inlet and outlet compartments, a valve regulating the supply to said inlet compartment of the liquid to be measured, and controlling means for said valve jointly responsive to the accumulation of liquid in said outlet compartment and to the rate of flow over the weir, and tending to adjust the valve to increase the supply of liquid on a fall in the liquid level in said outlet compartment or an increase in the rate of flow over the weir, and to decrease the supply of liquid on a rise in the liquid level in said outlet compartment or on a decrease in the rate of flow over the weir.

3. In combination, a measuring tank, a weir dividing it into inlet and outlet compartments, means regulating the supply to said inlet compartment of the liquid to be measured, including a differential pressure device responsive to the difference between the liquid heads in said compartments, and coöperating mechanism whereby the liquid level in said outlet compartment is prevented from falling below or rising above predetermined minimum and maximum limits while with intermediate heights of liquid level in the outlet compartment the supply of liquid to be measured is regulated by the difference between the heads in the different compartments.

4. Liquid flow measuring apparatus comprising a weir and formed with an inlet compartment and an outlet compartment into which the liquid to be measured flows from said inlet compartment over said weir, a valve regulating the supply of liquid to be measured to said inlet compartment, and controlling means for said valve comprising a differential pressure device having one pressure chamber connected to one of said compartments and a second pressure chamber connected to the other compartment, the connection between each chamber and the corresponding compartment opening to the latter below the water level normally prevailing therein.

5. Liquid flow measuring apparatus comprising a weir and formed with an inlet compartment and an outlet compartment into which the liquid to be measured flows from said inlet compartment over said weir, a valve regulating the supply of liquid to be measured to said inlet compartment, and controlling means for said valve comprising a differential pressure device having one pressure chamber connected to one of said compartments and a second pressure chamber connected to the other compartment, and adjustable loading means for said device, the connection between each chamber and the corresponding compartment opening to the latter below the water level normally prevailing therein.

JOSEPH W. GAMBLE.

Witnesses:
 ARNOLD KATZ,
 D. STEWART.